(12) United States Patent
Ahmadi Mehr et al.

(10) Patent No.: US 9,306,690 B2
(45) Date of Patent: Apr. 5, 2016

(54) TRANSMITTER

(71) Applicant: NXP B.V., Eindhoven (NL)

(72) Inventors: Seyed Amir Reza Ahmadi Mehr, Delft (NL); Robert Bogdan Staszewski, Delft (NL); Mark Pieter van der Heijden, 's-Hertogenbosch (NL)

(73) Assignee: SAMBA HOLDCO NETHERLANDS B.V., Eindhoven (NL)

( * ) Notice: Subject to any disclaimer, the term of this patent is extended or adjusted under 35 U.S.C. 154(b) by 241 days.

(21) Appl. No.: 13/914,822

(22) Filed: Jun. 11, 2013

(65) Prior Publication Data

US 2013/0343173 A1 Dec. 26, 2013

Related U.S. Application Data

(60) Provisional application No. 61/657,934, filed on Jun. 11, 2012.

(30) Foreign Application Priority Data

May 24, 2013 (EP) .................................... 13169216

(51) Int. Cl.
*H04L 27/01* (2006.01)
*H03D 3/00* (2006.01)
(Continued)

(52) U.S. Cl.
CPC ................ *H04J 1/20* (2013.01); *H04B 1/0483* (2013.01); *H04B 2001/0491* (2013.01)

(58) Field of Classification Search
USPC ......... 375/219, 221, 222, 294, 293, 295, 311, 375/307, 306, 303, 302, 316, 344, 345, 346, 375/338, 339, 354, 356, 362, 373, 374, 375, 375/376, 220, 226, 240.26–240.28, 285, 375/284, 278, 324, 327, 326, 325, 340, 323, 375/322, 347

See application file for complete search history.

(56) References Cited

U.S. PATENT DOCUMENTS 7,324,788 B2   1/2008 Ramet et al.
7,626,462 B1 * 12/2009 Hietala et al. ..................... 331/2
(Continued)

FOREIGN PATENT DOCUMENTS

CN   101589550 A   11/2009
CN   102098267 A   6/2011
(Continued)

OTHER PUBLICATIONS

Staszewski, R. B. et al. "Spur-Free All-Digital PLL in 65nm for Mobile Phones", Solid-State Circuits Conference Digest of Technical Papers (ISSCC), 3 pgs (2011).
(Continued)

*Primary Examiner* — Linda Wong
(74) *Attorney, Agent, or Firm* — McDonnell Boehnen Hulbert & Berghoff LLP

(57) ABSTRACT

The invention provides a transmitter comprising two (or more) phase locked loops controlling respective oscillators, and implementing different phase modulation. Multiple phases are derived from the respective oscillators, and an edge rotator forms an output signal from a combination of the phases. The oscillators can operate at different frequencies, neither of which is an integer multiple of the other, whereas the output signals of the multiplexers of the first and second phase locked loops are closer in frequency and can be the same. This reduces the problem of pulling, with a circuit that can be implemented with low power and area and with the versatility of being digitally intensive.

14 Claims, 10 Drawing Sheets

(51) Int. Cl.
*H04J 1/20* (2006.01)
*H04B 1/04* (2006.01)

(56) References Cited

U.S. PATENT DOCUMENTS

| | | | |
|---|---|---|---|
| 7,667,551 B2* | 2/2010 | Lin | H04L 27/12 332/100 |
| 7,729,445 B2 | 6/2010 | Ravi et al. | |
| 8,847,680 B2 | 9/2014 | Bowles et al. | |
| 2008/0055010 A1 | 3/2008 | Lerner et al. | |
| 2009/0074123 A1* | 3/2009 | Hsueh | H03L 7/087 375/360 |
| 2011/0032067 A1 | 2/2011 | Le Guillou et al. | |
| 2012/0025918 A1* | 2/2012 | Wang | H03L 7/0996 331/25 |
| 2012/0027143 A1* | 2/2012 | Wang | H03L 7/0996 375/354 |

FOREIGN PATENT DOCUMENTS

| | | |
|---|---|---|
| EP | 1 555 757 A1 | 7/2005 |
| EP | 1 868 295 A2 | 12/2007 |

OTHER PUBLICATIONS

Heidari, M. E. et al. "All-Digital Outphasing Modulator for a Software-Defined Transmitter", Journal of Solid-State Circuits, vol. 44, No. 4, pp. 1260-1271 (Apr. 2009).

Poon, A. et al. "Reduction of Inductive Crosstalk Using Quadrupole Inductors", IEEE Journal of Solid-State Circuits, vol. 44, No. 6, pp 1756-1764 (Jun. 2009).

Pellerano, S. et al. "A 4.75-GHz Fractional Frequency Divider-by-1.25 With TDC-Based All-Digital Spur Calibration in 45-nm CMOS", IEEE Journal of Solid-State Circuits, vol. 44, No. 12, pp. 3422-3433 (Dec. 2009).

Tohidian, M. et al. "High-Swing class-C VCO", Proceedings of the ESSCIRC, pp. 495-498 (2011).

Van der Heijden, M. P. et al. "A 19W High-Efficiency Wide-Band CMOS-GaN Class-E Chireix RF Outphasing Power Amplifier", IEEE MTT-S International Microwave Symposium Digest, pp. 1-4 (Jun. 2011).

Office Action from Counterpart application CN 201310225133.4 (Mar. 24, 2015).

Extended European Search Report for counterpart application EP13169216.2 (Oct. 30, 2013).

* cited by examiner

TRANSMITTER

CROSS-REFERENCE TO RELATED APPLICATIONS

This application claims the priority under 35 U.S.C. §119 of U.S. patent application No. 61/657,934, filed on Jun. 11, 2012, and European patent application no. 13169216.2, filed May 24, 2013, the contents of which are incorporated by reference herein.

This invention relates to transmitters, and in particular to transmitters which combine two channels with different phase modulation. This type of transmitter is known as an outphasing transmitter.

There is an increasing demand for a highly reconfigurable modulator that can handle different wireless communications standards such as GSM, WCDMA and LTE of 3GPP.

The continuous push towards system-level integration and, recently, the integration of multiple radios/channels on the same system-on-chip (SoC) die present particular difficulties. Examples of such integration are for multi-radio cores or communication channels. In these RF-SoC designs, interference coupling sets a severe limitation on the performance of RF circuits. One of the main problems from such coupling is injection pulling. The problems of injection pulling and signal integrity will keep on increasing.

Any oscillatory system, such as an LC-tank-based phase locked loop (PLL), is generally vulnerable to injection pulling through electromagnetic, capacitive, substrate, ground, and supply parasitic coupling. This pulling is likely to be the main cause that limits the spectral purity of the transmitter output.

In order to achieve a high level of integration in RF CMOS ICs, designers need to put different VCO's close to each other, and this may lead to increased cross talk and negative effects on the circuit operation.

One way to solve this problem is by employing 8-shape inductors. As reported in A. Poon, A. Chang, H. Samavati, and S. Wong, "Reduction of inductive crosstalk using quadrupole inductors," Solid-State Circuits, IEEE Journal of, vol. 44, no. 6, pp. 1756-1764, June 2009, 30 dB of magnetic coupling reduction could be achieved, however, other coupling paths are unaffected. This is at the cost of larger area and reduction of the inductor quality (Q) factor. This approach also cannot reduce pulling of the output power amplifiers (PAs).

Nowadays there is a strong push to integrate an RF power amplifier (PA) with the rest of the transmitter due to cost reasons. This has already happened in wireless connectivity (e.g., Bluetooth, WiFi) and is now happening for cellular mobiles.

On the base station side, integrating a 200 W power amplifier on the same die as the transmitter is not seriously considered yet. However, there are attempts to integrate the RF front-end portion with the PA within the same package. In this scenario, the harmonics of PA output or even the transmitter output driver are typically not attenuated enough and can injection-pull the oscillator, even though an integer edge divider is used between the oscillator and PA driver.

FIG. 1 shows the problem of aggressors/victims in the most recent multi-core radios. A set of radio cores is shown, each comprising an all-digital phase locked loop (ADPLL) which drives (as part of a control loop) a digitally controlled oscillator (DCO). A buffer (BUF) and divider arrangement drive the power amplifier. The problem of pulling is represented by the arrows 10 in the figure.

A method of mitigating pulling through a phase rotation has been proposed, e.g. four phase rotation. However, this introduces excessive amount of noise since a number of devices are inserted in the feed-forward path, each adding their own phase noise contribution.

A four phase rotation system is disclosed in the article "A 4.75 GHz Fractional Frequency Divider-by-1.25 With TDC-Based All-Digital Spur Calibration in 45-nm CMOS" by Stefano Pellerano et. al., in IEEE Journal of Solid State Circuits vol. 46 No. 12 December 2009.

The invention is defined by the claims.

According to the invention, there is provided a transmitter comprising:

a phase modulator;

a first phase locked loop controlled by a first oscillator and receiving a first phase modulated signal from the phase modulator;

a second phase locked loop controlled by a second oscillator and receiving a second phase modulated signal from the phase modulator; and a power amplifier driven by the outputs of the first and second phase locked loops, means for deriving multiple phases from the phase locked loops; and an edge rotator (32) associated with each phase locked loop to form a respective output signal from a combination of the multiple phases, wherein the first and second oscillators operate at different frequencies, neither of which is an integer multiple of the other, and the output signals are closer in frequency than the first and second oscillator frequencies.

The invention provides a low-power architectural solution that avoids the pulling problem through a frequency translation of aggressor/victim circuits. It can be used in RF cellular base station or mobile station, and extra care is taken to implement it in an ultra-low phase-noise manner.

The output signals of the edge rotators of the first and second phase locked loops can be the same (or sufficiently close that they would suffer from pulling effects if generated by the oscillators), but the oscillator frequencies are separated.

The means for deriving multiple phases is for example for deriving 4, 8 or more phases. These phases enable frequency translation when combining the phases to generate the output signals.

The means for deriving multiple phases can comprise a divider and the edge rotator can have a respective multiplexer to select different phases at different times. However, other ways of generating different phase signals can be used.

Each divider can comprise a divide by 4 divider for deriving 8 phases and each edge rotator can comprises a ring counter. The ring counter controls the cycling through the phases, and thereby construct a new waveform.

The ring counter of the edge rotator of the first phase locked loop preferably rotates in the opposite sense to the ring counter of the edge rotator of the second phase locked loop. This means that one implements an increase in frequency compared to the phase signals from the divider and the other implements a decrease in frequency.

In one implementation, the first phase locked loop and the second phase locked loop are all-digital, and the first and second oscillators are digitally controlled. This provides a digitally-intensive approach which creates more options for system design. Moreover, a digital approach provides low cost and much better performance than its analog counterpart.

By introducing frequency planning by means of a fractional ratio between the local oscillators and the transmitter power amplifier (or its driver) output frequencies, the pulling issues due to various multiple paths can be prevented. In this way, the integer harmonic relationship between the PA output and oscillators can be eliminated.

For example, the use of 8 or more phases enables a range of fractional divider ratios to be implemented. One preferred implementation uses exactly 8 phases, but the invention could be implemented with 4 or 16 or another number of phases.

The first and second phase locked loops can each comprise a retiming circuit for generating multiplexer control signals.

The first and second oscillators are preferably each tunable, with a different tuning range. In one example the first oscillator is tunable with a tuning range 6.45 GHz to 8.5 GHz and the second oscillator is tunable with a tuning range from 7.15 GHz to 9.2 GHz.

By using an 8 phase system, the period of the output of the first phase locked loop can be one of 3.5, 4.5, 4.75, 5.25, 6, 7, 8, 9, and 10 times the period of the first oscillator output signal, and the period of the output of the second phase locked loop can be a different one of 3.5, 4.5, 4.75, 5.25, 6, 7, 8, 9, and 10 times the period of the second oscillator output signal.

In one example the period of the output of the first phase locked loop is 3.5 times the period of the first oscillator output signal, and the period of the output of the second phase locked loop is 4.5 times the period of the second oscillator output signal.

The amplifier can be used in a mobile telephony base station.

Examples of the invention will now be described in detail with reference to the accompanying drawings, in which.

The invention provides a transmitter comprising two phase locked loops (PLLs), preferably all-digital PLLs, controlling respective oscillators, preferably digitally-controlled oscillators (DCOs), and implementing different phase/frequency modulation. Multiple phases, preferably equidistant phases, are derived from the respective oscillators, and a multiplexer forms an output signal from a combination of the phases. The oscillators can operate at different frequencies, neither of which is an integer multiple of the other nor that of the output, whereas average frequencies of the output signals of the multiplexers of the first and second phase locked loops can be substantially the same. This reduces the problem of pulling with a circuit that can be implemented with low power and area and with the versatility of being digitally intensive.

With a proper arrangement of the power amplifier network, the invention can thus provide a new outphasing modulator. An all-digital PLL can be at the heart of the design, and when such digital circuits are used, the architecture is highly reconfigurable. Both amplitude and phase modulation can be performed by a combination of two ADPLLs and two switched-mode PAs with a matching network.

The use of ADPLLs offers several advantages, for instance, it makes it possible to change the loop bandwidth, data rate and settling time on the fly. In contrast, with an analog design, it is impossible to achieve this performance with a very small area and power consumption.

To meet different standards, this design can incorporate two-point modulation of an ADPLL. This data modulation increases bandwidth beyond the loop bandwidth. This enables the modulator to be used with high bandwidth communication standards.

Figure 1:
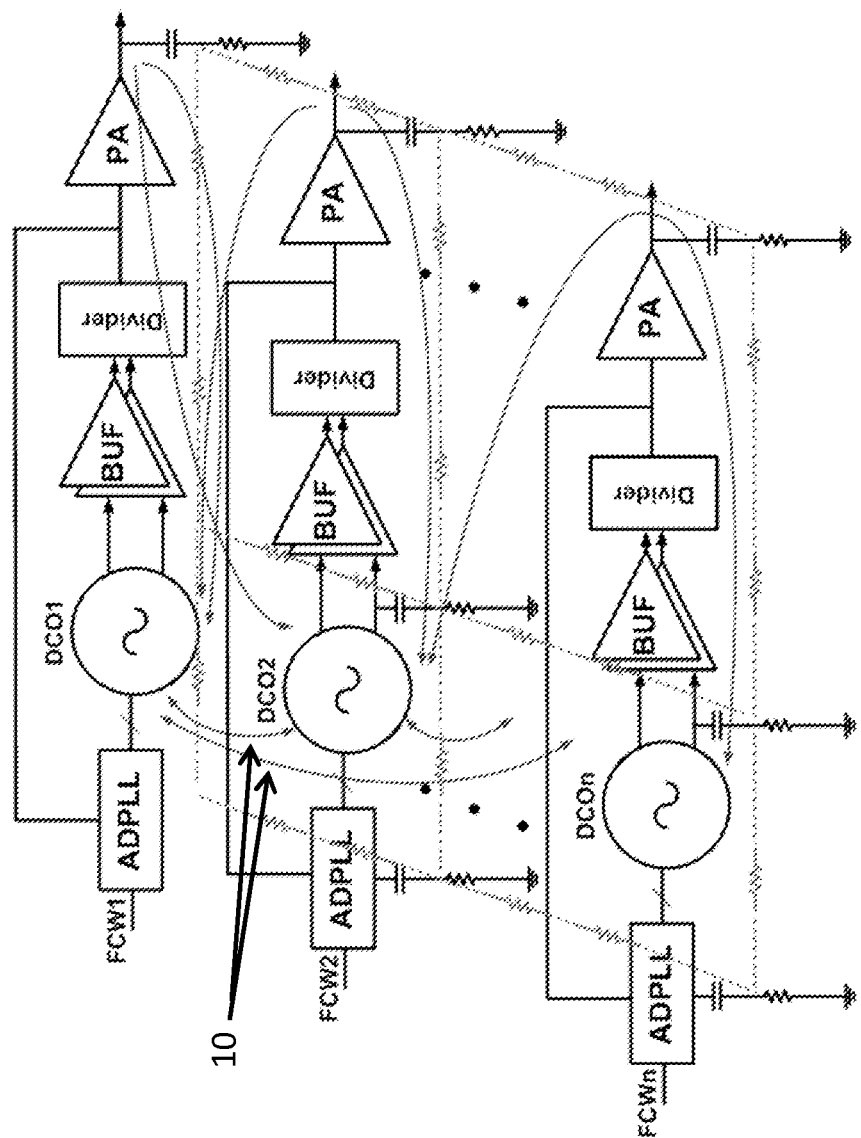
FIG. 1 shows the problem of aggressors/victims in multicore radios.
Figure 2:
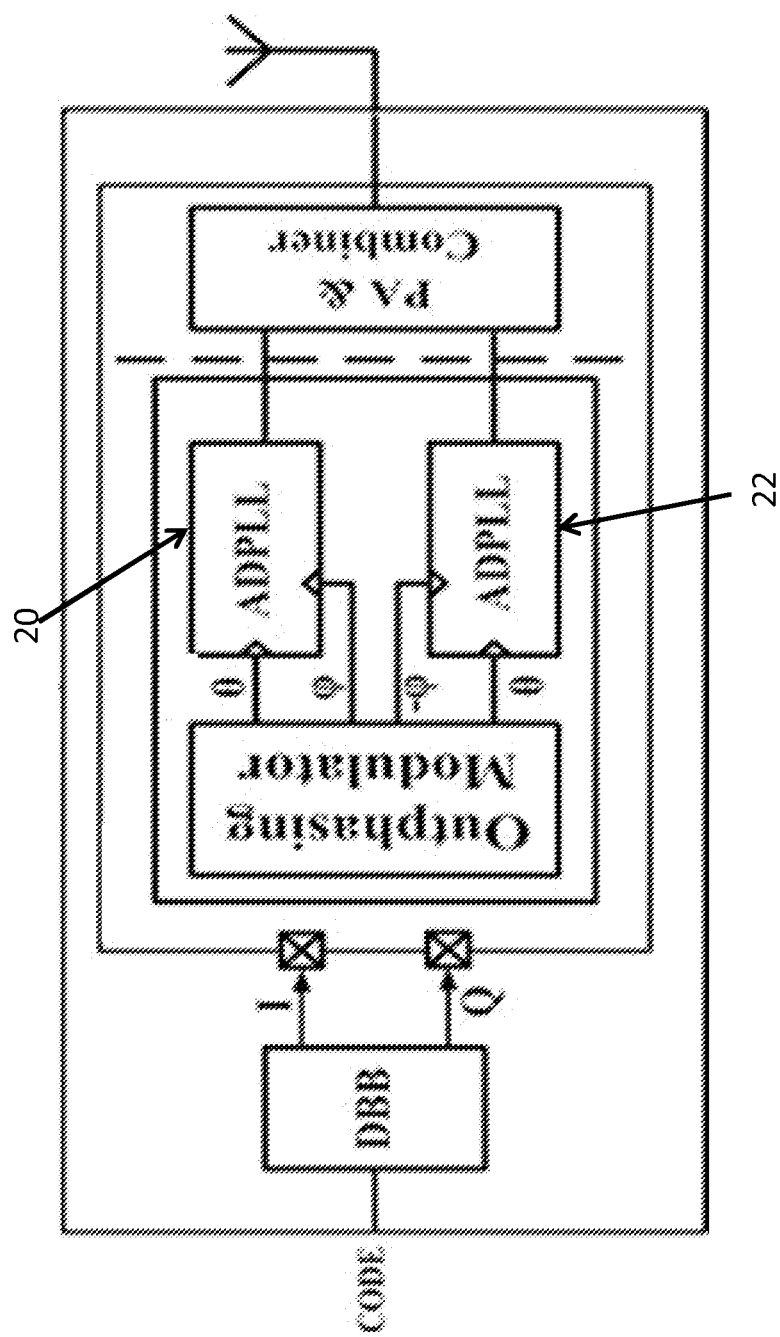
FIG. 2 shows the basic architecture of a transmitter of the invention.

The basic architecture is shown in FIG. 2. The input data code is provided to a unit for generating in-phase (I) and quadrature (Q) digital base band (DBB) signals. The architecture contains two ADPLLs 20, 22 which perform phase modulation via frequency modulation. The phase control signals are provided by an outphasing modulator. The ADPLLs drive the switched-mode power amplifiers and a combiner.

Reference is made to the article by M. van der Heijden, M. Acar, J. Vromans, and D. Calvillo-Cortes, "A 19 w high-efficiency wide-band CMOS-GaN class-E chireix RF outphasing power amplifier," in Microwave Symposium Digest (MTT), 2011 IEEE MTT-S International, June 2011, pp. 1-4.

The potential problem with this architecture is pulling since the two ADPLLs are on the same die and close to each other.

Recently an outphasing architecture based on an all-digital PLL (ADPLL) has been proposed. This is disclosed in "All-Digital Outphasing Modulator for a Software-Defined Transmitter" of Mohammad E. Heidari et. al., in IEEE Journal of Circuits, Vol. 44, No. 4, April 2009.

The design requires only one ADPLL to up-convert signals and perform phase modulation. This makes the architecture free of an analog mixer. A phase rotator is used to perform amplitude modulation. The phase rotator converts I and Q signals to phase.

This phase, known as the outphasing angle, is added to and subtracted from the actual phase in two different paths. To adjust the delay between these paths, a delay locked loop (DLL) is constructed.

This digital approach is not mature enough to be used in different parts of a design, and some parts of the circuits are still based on analog components, which is not desirable. For example, phase rotators are analog-intensive and are not configurable. Besides, the mechanism of whole system consists of an ADPLL and DLLs; together it is quite complicated.

The invention provides an approach in which frequency planning is employed, which means the core DCO of two ADPLLs work at different frequencies that are sufficiently far apart. In preferred versions, a digitally-intensive solution is provided.

Figure 3:
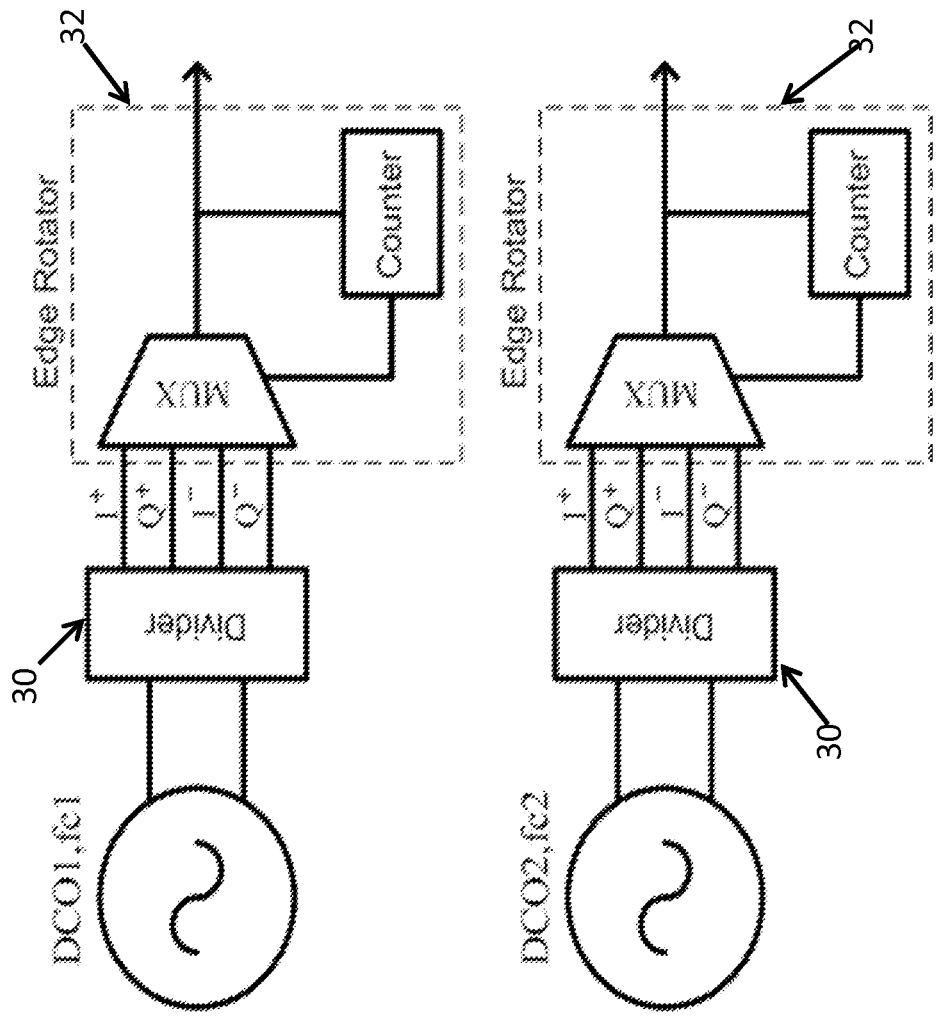
FIG. 3 shows the way the oscillators' frequencies are changed in accordance with the invention.

A block diagram of the preferred solution of the invention is shown in FIG. 3, which shows the two ADPLL cores. In particular, FIG. 3 shows the way the oscillators' outputs are processed. Each oscillator operates at a different frequency: fc1 and fc2. A divider 30 and edge rotator 32 together provide a phase rotator divider function. It should be noted that an oscillator could provide multiple phase outputs in which case the divider providing multiple outputs might not be needed. The improvement in phase noise and spurious tones is obtained on the following basis:

using digital-intensive approach, which is area and cost effective;

using ADPLLs creates more options for configurability;

two amplitude modulation and phase modulation paths are inherently synchronized with each other;

the two paths are aligned with each other since the two ADPLLs share the same frequency reference to which the PLLs are locked; and a mixed signal approach is provided to reduce the pulling effect.

The preferred example of the invention provides a mixed signal approach that can alleviate the pulling of the each system with different oscillators. The invention uses frequency planning. It is possible to use an integer (N) divider, but the problem is the harmonics can still cause pulling of the main oscillator. By using a fractional divider, the main frequency can be separated, and pulling can be reduced.

Figure 4:
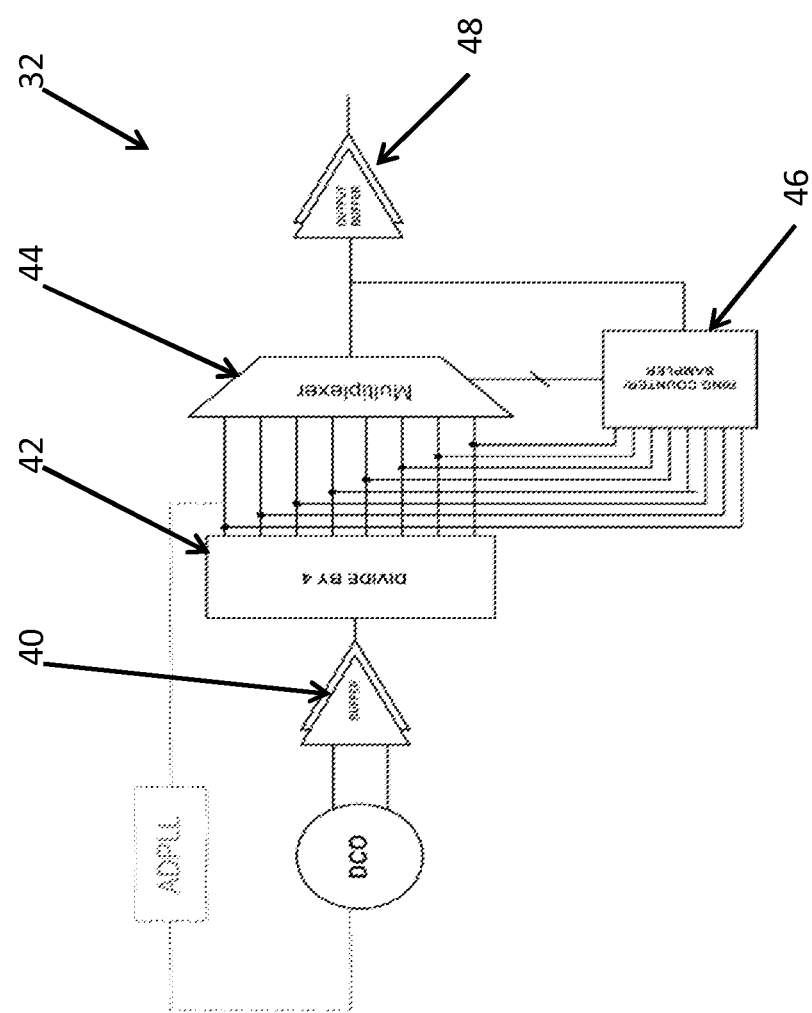
FIG. 4 shows a conceptual block diagram of the edge rotating system of FIG. 3.

FIG. 4 shows a conceptual block diagram of the edge rotating system 32 of FIG. 3. This example is based on an 8 phase edge rotating system. However a 4 phase system can be used, or even a 16 phase system. Also, a non-power-of-two phase system can be used.

In the 8 phase version, the DCO output, after passing through a buffer 40 is divided by 4 by the divider 42 to generate 8 different phase signals.

The 8 outputs are provided to a multiplexer 44, and one of the outputs is selected at any time based on the control signal provided by a ring counter 46. An output buffer 48 is also shown.

In order to understand the concept, consider that there are two DCO's. It is desired to have the same (or nearly the same) average output frequency after the divider/multiplexer, but the DCO center frequencies are different from each other.

Figure 5:
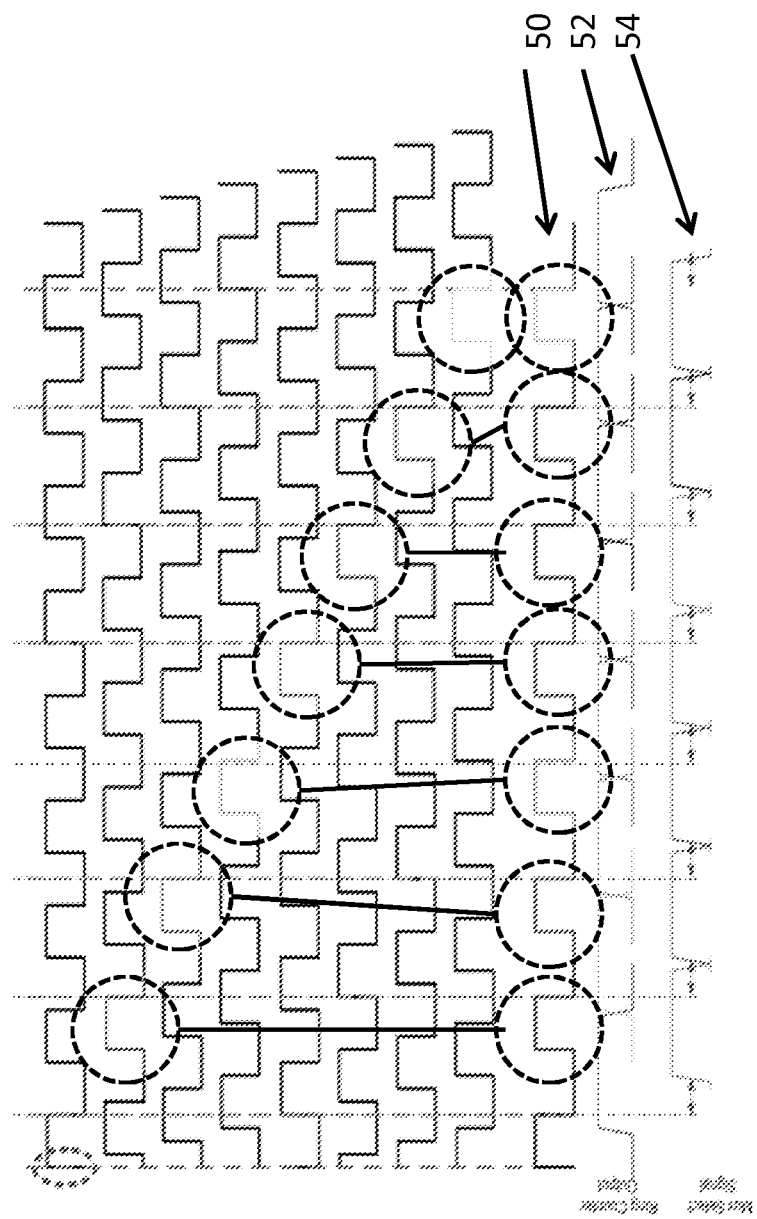
FIG. 5 shows how by selecting the phases in turn, it is possible to create a new output frequency.

FIG. 5 shows how by selecting the phases in turn, it is possible to create a new output frequency, shown by signal 50. This is generated by the ring counter output (signal 52) controlling the multiplexer select signal (signal 54).

In this way, it is possible to have the same output frequency but the DCO frequencies are separate from each other. This reduces the pulling significantly. In order to properly select the edge, a state machine can be implemented.

The output generated clock can be used to trigger the ring counter. This counter has ability to set and reset.

Figure 6:
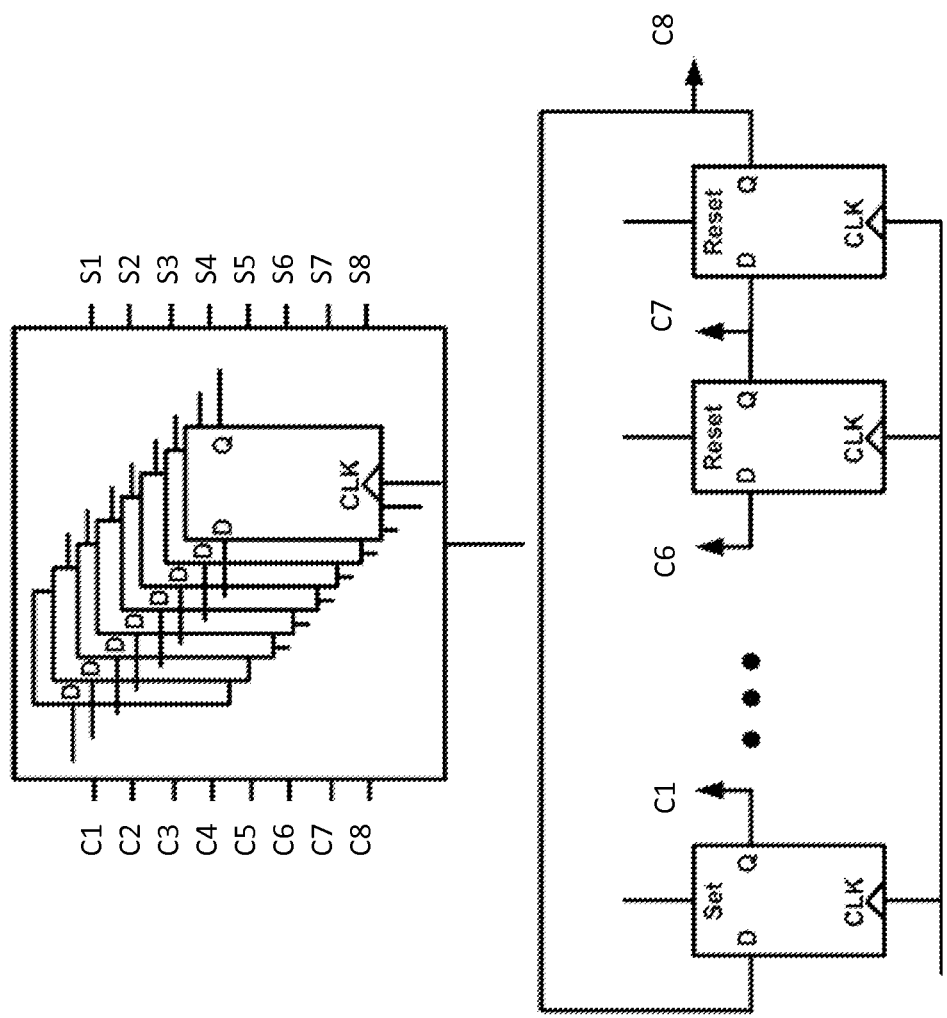
FIG. 6 shows the ring counter in schematic form.

FIG. 6 shows the ring counter in schematic form.

It comprises a closed loop of flip flops. The output phases are labeled C1 to C8. A retiming circuit (shown at the top of FIG. 6) uses the output phases C1 to C8 to generate multiplexer control signals S1 to S8. By correct sampling of the output of the counter, the proper edges can be selected, as shown in FIG. 5. The sampling edge is chosen in such a way that the setup and hold times of the flip flops in different corners are met. The overhead area and power of such systems is very low.

The operation of the preferred example of system of the invention will now be described in more detail.

As mentioned above, the system contains two oscillators, each with an edge rotator. This corresponds to a two-channel system. More than two such channels could be used in general. The frequency translation direction depends on the edge rotation direction. The frequencies of the two channel outputs are the same (fo1=fo2) but the center frequencies of the oscillators (fc1, fc2) are well separated. Thus, the coupling between the oscillators as well as between the outputs and oscillators is no longer problematic.

As mentioned above, a fractional divider with an 8-phase rotation is provided in order to accomplish the pulling mitigation.

Figure 7:
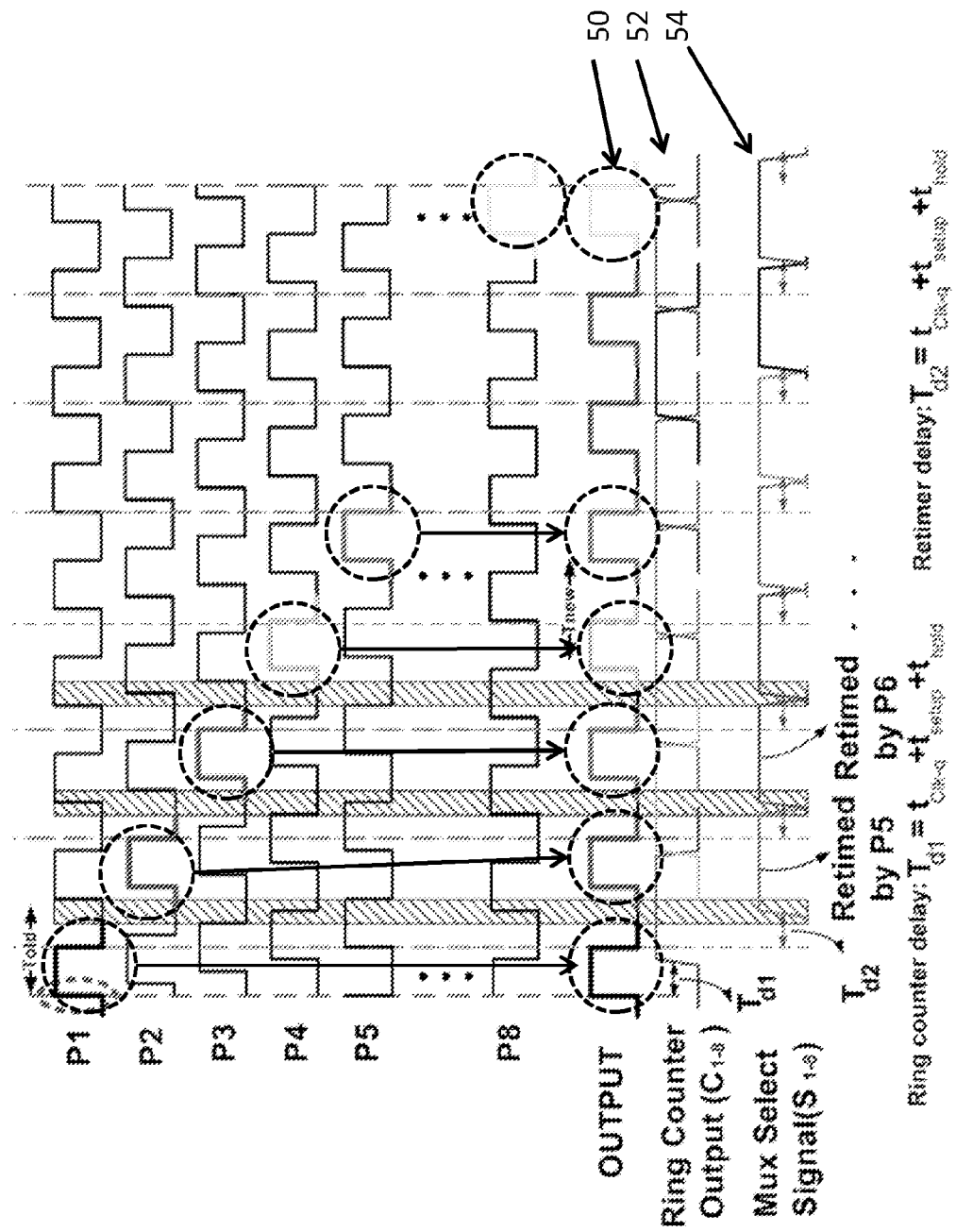
FIG. 7 shows the internal waveforms in more detail when the edge rotator in FIG. 3 is commanded to rotate its 8 phases counter-clockwise (i.e. constant phase retarding)

FIG. 7 shows the internal waveforms in more detail when the edge rotator in rotator is commanded to rotate its 8 phases counter-clockwise (i.e., constant phase retarding).

The ring counter output waveform shows all 8 signals C1 to C8 superposed. Each signal has only one pulse every 8. Similarly, the multiplexer select signals S1 to S8 are shows superposed and again each signal has only one pulse every 8.

Figure 9:
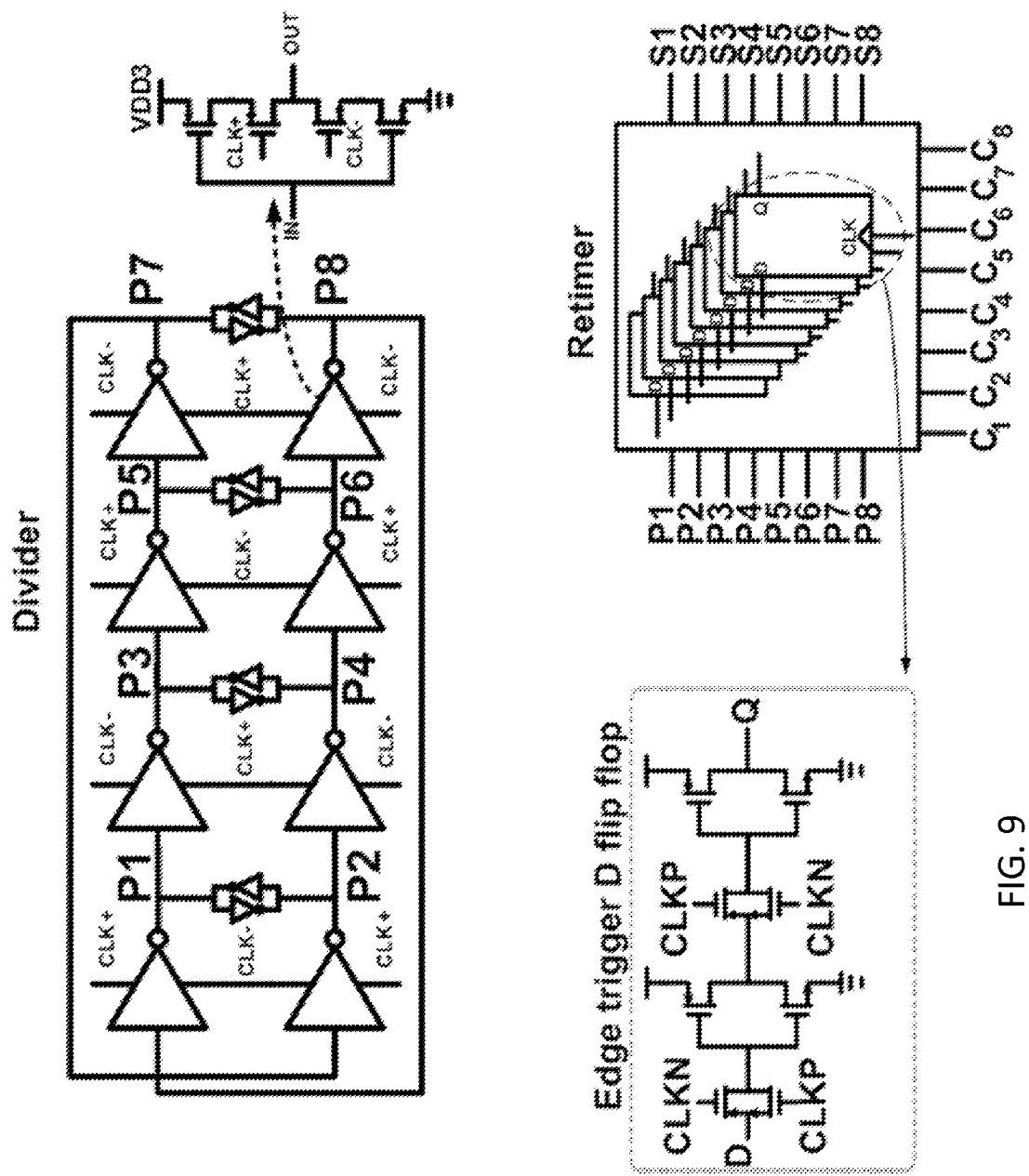
FIG. 9 shows the retiming circuit in more details as well as the divider.

The timing of the multiplex control signals is based on the phase signals, which are the signals generated by the divider 42 (shown in FIG. 9).

The way the phases P5 and P6 control the timing of the first two multiplex select signals is shown in FIG. 7. There is a delay from the start of the phase signal (such as P5) to the start of the associated multiplexer select signal (such as the first pulse of signal 54 in the case of phase P5), and this is shown as Td2. The same delay is also present between the leading edge of a phase signal and the corresponding ring counter signal. This is shown as Td1.

By picking a rising edge of the next retarded divider phase, the output clock edges lag, thus resulting in the frequency decrease by ⅛. The output is made of a sequence of pulses, which derive from the different phases in turn.

The other rotator operates in the opposite direction.

In this way, one rotator/multiplexer reduces its DCO frequency to generate the output frequency, and the other rotator/multiplexer increases its DCO frequency to generate the same output frequency.

Figure 8:
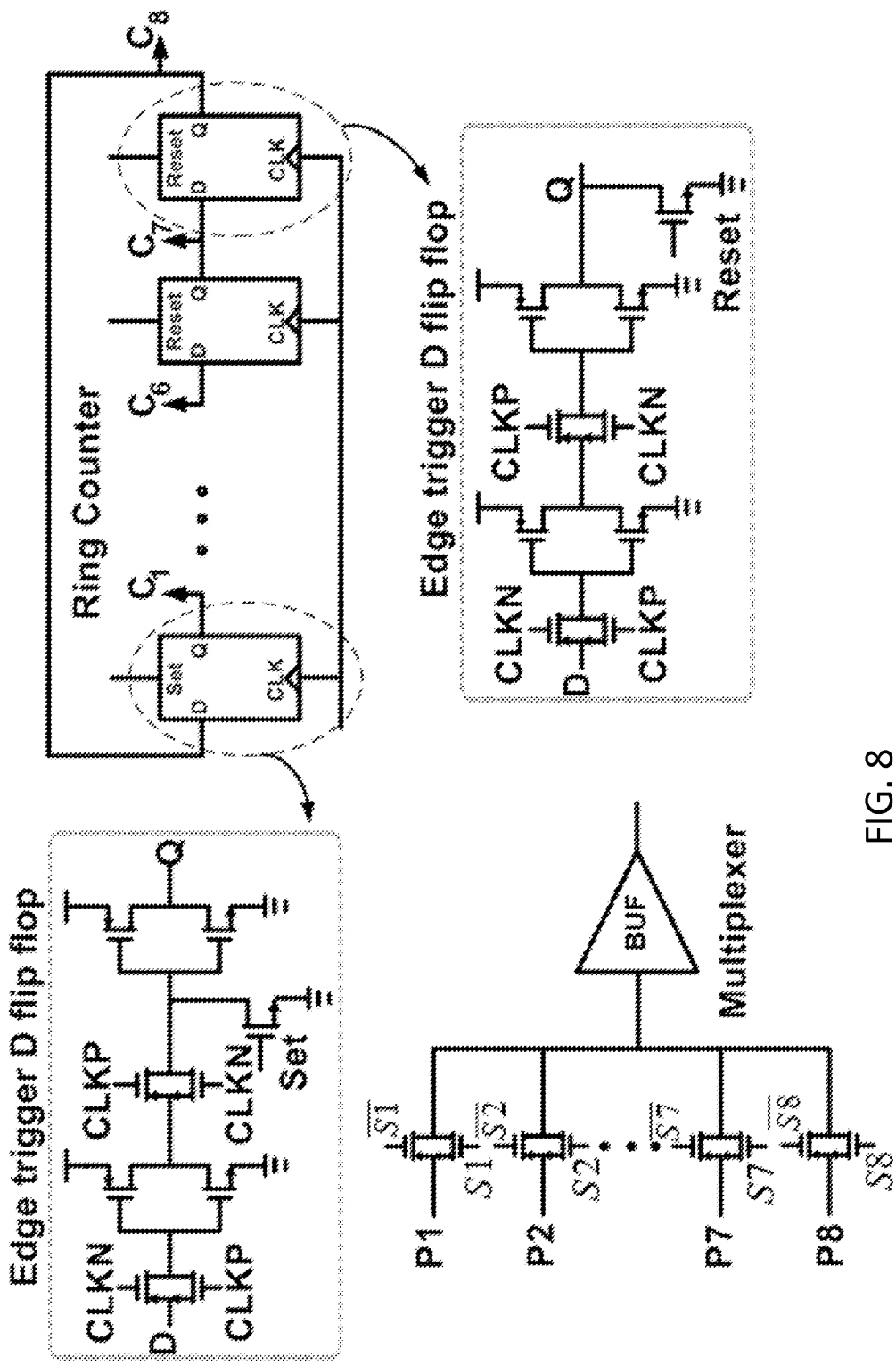
FIG. 8 shows a system level schematic and circuit details for the various components.

FIG. 8 shows a system level schematic and circuit details for the various components.

The ring counter is shown again. It has a set flip flop and a chain of reset flip flops. The set and reset flip flops are shown in more detail, each in the form of edge triggered D-type flip flops. The set/reset flip flops control the normal pass-through or the fractional division. Edge-triggered D flip-flops retime the ring counter output signals for the appropriate edge selection.

The multiplexer is also shown, which comprises a set of parallel complementary pass gate switches controlled by S1 to S8, for selectively coupling one of the phases P1 to P8 to an output buffer which provides strong driving capability. The parallel connection provides an OR function.

FIG. 9 shows the retiming circuit in more details as well as the divider. The divide by 4 is implemented by a static CMOS divider to generate the eight equidistant phases P1 to P8. The retimer is implemented as a stack of edge triggered D type flip flops clocked by the ring counter outputs C1 to C8, to control the switching of the phase signals P1 to P8 thereby to generate the multiplex control signals S1 to S8.

To minimize the phase noise degradation of the output clock, extreme care must be taken to limit the device count on the feed-forward path to the absolute minimum, thus putting all the signal processing complexity on the non-critical feedback path. According to simple equations, divide by 4 dividers can generate the additional divide ratios of 4.5 and 3.5:

$$T_{out1} = T_{osc1} \times 4 \times 9/8 = 4.5 \times T_{osc1};$$

$$T_{out2} = T_{osc2} \times 4 \times 7/8 = 3.5 \times T_{osc2}.$$

One of these time periods is based on a time lag of one phase per cycle (by retarding through the phases), and the other is based on a gain of one phase per cycle (by advancing through the phases).

In order to have a reliable selection of the edges, the select signal should come in the shaded area of FIG. 7. To guarantee this, consideration of the worst-case timing uncertainty is needed. The critical timing delay consists of setup/hold time and clock-to-Q delay of the flip-flops of both the ring counter and retiming circuit. In order to relax the timing, an edge trigged flip-flop is chosen that exhibits small setup and hold times. Taking into account these delays results in choosing the appropriate signal phase (P1-P8) to retime the counter output to generate a correct select signal for the multiplexer (S1-S8).

As mentioned above, the benefit of the phase-switched dividers is that they can operate at higher frequencies and are well suited for RF applications. However, phase-rotating dividers are sensitive to inherent mismatches and can generate significant spurs. These spur levels are typically non-essential when the fractional dividers are used in the feedback path of a frequency synthesizer.

It is possible to relate the maximum tolerable phase mismatch given the spurious-free dynamic range (SFDR) required at the output of the divider.

The divider is generally not limited to 3.5 and 4.5 divisions. By further modifying the selection path, different division ratios can be achieved. By closer inspection of the waveforms, equations such as Tnew=Told×2+Told/2 and Tnew=Told×2+Told/2+Told/8 can be derived (Told and Tnew are shown in FIG. 7) which gives ratios of 10 and 5.25. Further investigation shows that ratios of 4.75, 6, 7, 8, 9 can also be achieved.

Besides the injection pulling management, the fractional divider can be used to further extend the frequency range for multi-band radios.

Figure 10:
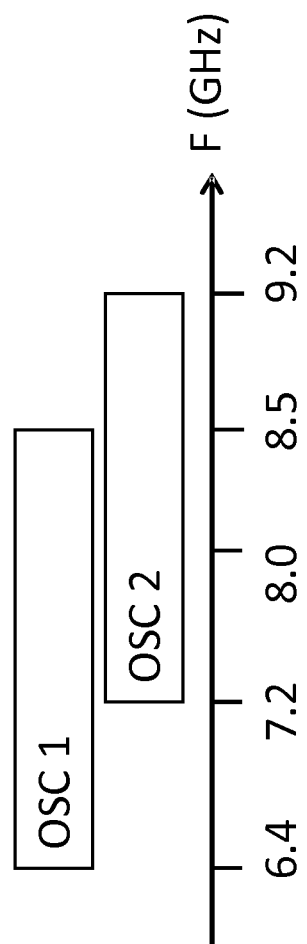
FIG. 10 shows two overlapping tuning ranges.

FIG. 10 shows the two oscillators with overlapping tuning range. In a well-finetuned system, the overlap should be minimized. The first oscillator is tunable from 6.45 GHz to 8.5 GHz and the second from 7.15 GHz to 9.2 GHz.

The two oscillators operate in a modified class-C architecture, for example as explained in M. Tohidian, A. Fotowat-Ahmadi, M. Kamarei, and F. Ndagijimana, "High-swing class-C VCO," in ESSCIRC (ESSCIRC), 2011 Proceedings of the ESSCRIC, September 2011, pp. 495-498.

By way of example, the tuning range of both oscillators can be around 26%. The oscillators can have a 5-bit binary-weighted coarse MOM capacitor bank, a 2-bit fine MOM capacitor bank, and a linear varactor for a continuous tuning range of 15 MHz.

The oscillator core area can be 0.18 mm2. A resistive ac-coupled buffer can be cascaded with an inverter to drive the divide by CMOS divider that generates the eight phases. The measured oscillator FoM at 3 MHz offset over the entire tuning range is 185 dB and phase noise at 2 GHz output is −143 dBc/Hz, respectively. Moreover, the noise floor measures −156 dBc/Hz and varies around 1 dB by activating the edge rotation.

The switched capacitor structure is used to coarsely tune the resonant frequency. The size of the switch transistors is set as a compromise between their parasitic capacitance (too large switches would reduce the tuning range) and the phase noise degradation (two small switches would introduce resistive losses in the on-state, thus reducing the Q factor of the switched capacitors). For reliability reasons, all the oscillator core transistors are thick oxide devices.

In order to demonstrate the effectiveness of the approach, the oscillators and programmable fractional dividers have been implemented in 65 nm CMOS. The total chip area was 0.82 mm2, while each oscillator occupied 0.18 mm2 as mentioned above. The two frequency generating channels are placed 200 μm apart on the same CMOS die. This corresponds to a tight floorplanning environment of today's commercial multi-channel SoCs.

The supply and ground connections to the two oscillators are separated on the die. The measured current consumption is 12 mA at 1.7 V for each oscillator and 1.3 mA at 1.2 V for each resistive buffer. The estimated (i.e., mixture of measurements and simulations) current consumption is 2.5 mA for the divider and 0.5 mA for the 2 GHz 8-phase rotator, both at 1.2 V.

The injection pulling scheme has been successfully verified with RF performance satisfying the intended base station transmitter system.

With the two oscillators separated by only 200 μm, their mutual coupling is expected to be high. With closer than 200 kHz separation, the two oscillators experience injection locking. In order to avoid the injection locking and to suppress the injection pulling in the normal system operation, the phase rotators can be activated at the same time but in the opposite directions, thus separating the resonant frequencies by 2 GHz. As desired, both outputs are again at the same frequency, although at different duty cycles, which is corrected up-stream. However, the pulling is now almost non-existent due to large separation of the two resonating frequencies. It has been found that the generated spur level would be immeasurably small below −80 dBc and located 2 GHz from the main carrier.

The example of the invention described above thus provides a fractional divider based on an 8-phase rotator for injection-pulling mitigation. Inserting the rotator between an oscillator and a PA or PA driver in a 2-channel communication system-on-chip (SoC) allows the oscillators to resonate at frequencies far away from each other and form the common output frequency. This way, any potential injection pulling generating spurs can be avoided. The coupling of two oscillators is normally so tight that they would injection lock. Separating the center frequency of them by 28% can reduce the injection pulling spurs to an ultra-low value. The SoC has been experimentally verified in 65 nm CMOS for a targeted base station transmitter.

The preferred example of the invention described above provides an all-digital outphasing transmitter which can meet all communications standards. The architecture targets base-station applications.

In particular, a two-channel RF generation system is provided, for example for a 2 GHz base station transmitter that avoids pulling due to various parasitic coupling paths, especially between a strong RF output and a sensitive LC-tank of an RF oscillator. This is achieved through a fractional frequency translation by means of a programmable fractional divider. Any frequency relationship of victims/aggressors within and between the RF transmission channels is avoided, and thus rendered harmless in the creation of injection pulling spurs. The proposed method can push the injection pulling spur far away from the carrier.

The use of an all-digital phase locked loop and digitally controlled oscillators is just one example, with the advantages explained above. However, the invention can be implemented with analogue phase locked loops and other types of oscillator. The use of the divider and rotator is not the only way to derive the desired multiple phases. For example, the oscillator architecture can provide all phases, and thereby itself define the means for deriving multiple phases.

The invention relates in particular to the provision of two oscillators which can be in close proximity, by using a phase rotation approach to convert two different oscillator frequencies such that the output signals after the phase rotations are closer in frequency than the oscillator frequencies.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A transmitter comprising:
an all digital first phase locked loop controlling a first oscillator and receiving a first phase modulated signal;
an all digital second phase locked loop controlling a second oscillator and receiving a second phase modulated signal;
a power amplifier driven by the outputs of the first and second phase locked loops;
a divider deriving multiple phases from the first and second phase locked loops; and
an edge rotator associated with each phase locked loop to form a respective output signal from a combination of the multiple phases,
wherein the first and second oscillators operate at different frequencies, the frequency of the first oscillator is not an integer multiple of the frequency of the second oscillator, and the output signals are closer in frequency than the first and second oscillator frequencies,
wherein an average of the frequencies of the output signals of each edge rotator of the first and second phase locked loops are the same.

2. A transmitter as claimed in claim 1 wherein the deriving includes deriving 4, 8 or more phases.

3. A transmitter as claimed in claim 1, wherein each edge rotator of the first and second phase locked loops comprises a respective multiplexer.

4. A transmitter as claimed in claim 3, wherein the divider comprises a divide by 4 divider for deriving 8 phases.

5. A transmitter as claimed in claim 3, wherein each edge rotator of the first and second phase locked loops comprises a ring counter.

6. A transmitter as claimed in claim 5, wherein the ring counter of the edge rotator of the first phase locked loop rotates in the opposite sense to the ring counter of the edge rotator of the second phase locked loop.

7. A transmitter as claimed in claim 1, wherein the first phase locked loop and the second phase locked loop are all-digital, and the first and second oscillators are digitally controlled.

8. A transmitter as claimed in claim 1, wherein the first and second phase locked loops each comprise a retiming circuit for generating multiplexer control signals.

9. A transmitter as claimed in claim 8, wherein the retiming circuit comprises a set of edge triggered flip flops.

10. A transmitter as claimed in claim 1, wherein the first and second oscillators are each tunable, with a different tuning range.

11. A transmitter as claimed in claim 1, wherein the first oscillator is tunable with a tuning range 6.45 GHz to 8.5 GHz and the second oscillator is tunable with a tuning range from 7.15 GHz to 9.2 GHz.

12. A transmitter as claimed in claim 1, wherein the period of the output of the first phase locked loop is one of 3.5, 4.5, 4.75, 5.25, 6, 7, 8, 9, and 10 times the period of the first oscillator output signal, and the period of the output of the second phase locked loop is a different one of 3.5, 4.5, 4.75, 5.25, 6, 7, 8, 9, and 10 times the period of the second oscillator output signal.

13. A transmitter as claimed in claim 1, wherein the period of the output of the first phase locked loop is 3.5 times the period of the first oscillator output signal, and the period of the output of the second phase locked loop is 4.5 times the period of the second oscillator output signal.

14. A mobile telephony base station comprising a transmitter as claimed in claim 1.

* * * * *